United States Patent
Brody et al.

(10) Patent No.: US 12,099,702 B2
(45) Date of Patent: *Sep. 24, 2024

(54) MESSAGING SYSTEM FOR RESURFACING CONTENT ITEMS

(71) Applicant: Snap Inc., Santa Monica, CA (US)

(72) Inventors: Jonathan Dale Brody, Marina del Rey, CA (US); Alexander Collins, Santa Monica, CA (US); Benedict Copping, Los Angeles, CA (US); Linhui Ge, Sammamish, WA (US); Justin Huang, Los Angeles, CA (US); KaChon Lei, Los Angeles, CA (US); Eugene Park, Los Angeles, CA (US); Hui Wang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,761

(22) Filed: Apr. 19, 2023

(65) Prior Publication Data
US 2023/0251767 A1    Aug. 10, 2023

Related U.S. Application Data

(63) Continuation of application No. 17/129,509, filed on Dec. 21, 2020, now Pat. No. 11,693,539.

(51) Int. Cl.
*G06F 3/048* (2013.01)
*G06F 3/0481* (2022.01)
(Continued)

(52) U.S. Cl.
CPC .......... *G06F 3/0484* (2013.01); *G06F 3/0481* (2013.01); *H04L 51/08* (2013.01)

(58) Field of Classification Search
None
See application file for complete search history.

(56) References Cited

U.S. PATENT DOCUMENTS 10,296,512 B1 * 5/2019 Chandran ......... G06F 16/24578
11,062,358 B1    7/2021 Lewis et al.
(Continued)

FOREIGN PATENT DOCUMENTS

CN    116636190    8/2023
WO    2022140270    6/2022

OTHER PUBLICATIONS

"U.S. Appl. No. 17/129,509, Examiner Interview Summary mailed Jun. 22, 2022", 2 pgs.
(Continued)

*Primary Examiner* — William C Trapanese
(74) *Attorney, Agent, or Firm* — Schwegman Lundberg & Woessner, P.A.

(57) ABSTRACT

Methods, computer-readable storage media, and apparatuses for surfacing content items in a messaging system. The methods may include storing a content item generated by a client device of a user, the user associated with the messaging system and determining a score to assign to the interaction and updating a resurface score associated with the content item with the score. The methods may further include determining whether to resurface the content item to the user based on the resurface score and causing to be displayed on a display of the client device a user interface comprising a user interface item for the user to display the content item. The methods may further include updating weights used to determine the scores based on interactions of the user with the resurfaced content items.

20 Claims, 15 Drawing Sheets

(51) Int. Cl.
*G06F 3/0484* (2022.01)
*H04L 51/08* (2022.01)

(56) References Cited

U.S. PATENT DOCUMENTS

| | | | |
|---|---|---|---|
| 11,693,539 | B2 | 7/2023 | Brody et al. |
| 2010/0070587 | A1 | 3/2010 | Goldberg et al. |
| 2014/0189539 | A1 | 7/2014 | St. Clair et al. |
| 2016/0117344 | A1 | 4/2016 | Kleinpeter et al. |
| 2017/0126825 | A1* | 5/2017 | Yu .................... G06F 3/013 |
| 2017/0277740 | A1 | 9/2017 | Ghotbi et al. |
| 2018/0173376 | A1* | 6/2018 | Cohen .................... H04L 67/10 |
| 2019/0124023 | A1 | 4/2019 | Conroy et al. |
| 2022/0197456 | A1 | 6/2022 | Brody et al. |

OTHER PUBLICATIONS

"U.S. Appl. No. 17/129,509, Examiner Interview Summary mailed Nov. 23, 2022", 2 pgs.

"U.S. Appl. No. 17/129,509, Final Office Action mailed Sep. 29, 2022", 15 pgs.

"U.S. Appl. No. 17/129,509, Non Final Office Action mailed Dec. 24, 2021", 12 pgs.

"U.S. Appl. No. 17/129,509, Notice of Allowance mailed Jan. 19, 2023", 5 pgs.

"U.S. Appl. No. 17/129,509, Response filed Jun. 20, 2022 to Non Final Office Action mailed Dec. 24, 2021", 10 pgs.

"U.S. Appl. No. 17/129,509, Response filed Nov. 17, 2022 to Final Office Action mailed Sep. 29, 2022", 11 pgs.

"International Application Serial No. PCT/US2021/064386, International Search Report mailed Apr. 12, 2022", 4 pgs.

"International Application Serial No. PCT/US2021/064386, Written Opinion mailed Apr. 12, 2022", 5 pgs.

"U.S. Appl. No. 17/129,509, 312 Amendment filed Apr. 19, 2023", 9 pgs.

"U.S. Appl. No. 17/129,509, PTO Response to Rule 312 Communication mailed May 26, 2023", 2 pgs.

"International Application Serial No. PCT/US2021/064386, International Preliminary Report on Patentability mailed Jun. 29, 2023", 7 pgs.

* cited by examiner

MESSAGING SYSTEM FOR RESURFACING CONTENT ITEMS

PRIORITY CLAIM

This application is a continuation of U.S. patent application Ser. No. 17/129,509, filed on Dec. 21, 2020, which is hereby incorporated by reference in its entirety.

TECHNICAL FIELD

Embodiments of the present disclosure relate generally to messaging systems for resurfacing content items. More particularly, but not by way of limitation, embodiments of the present disclosure relate to determining content items within a messaging system to resurface to a user.

BACKGROUND

To engage users of a messaging system, the messaging system needs to ensure that the users have content to consume that is engaging. The content may include many content items that are generated by the user, other users, and by sources outside the messaging system. Often the number of content items that are generated by a user is extensive.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
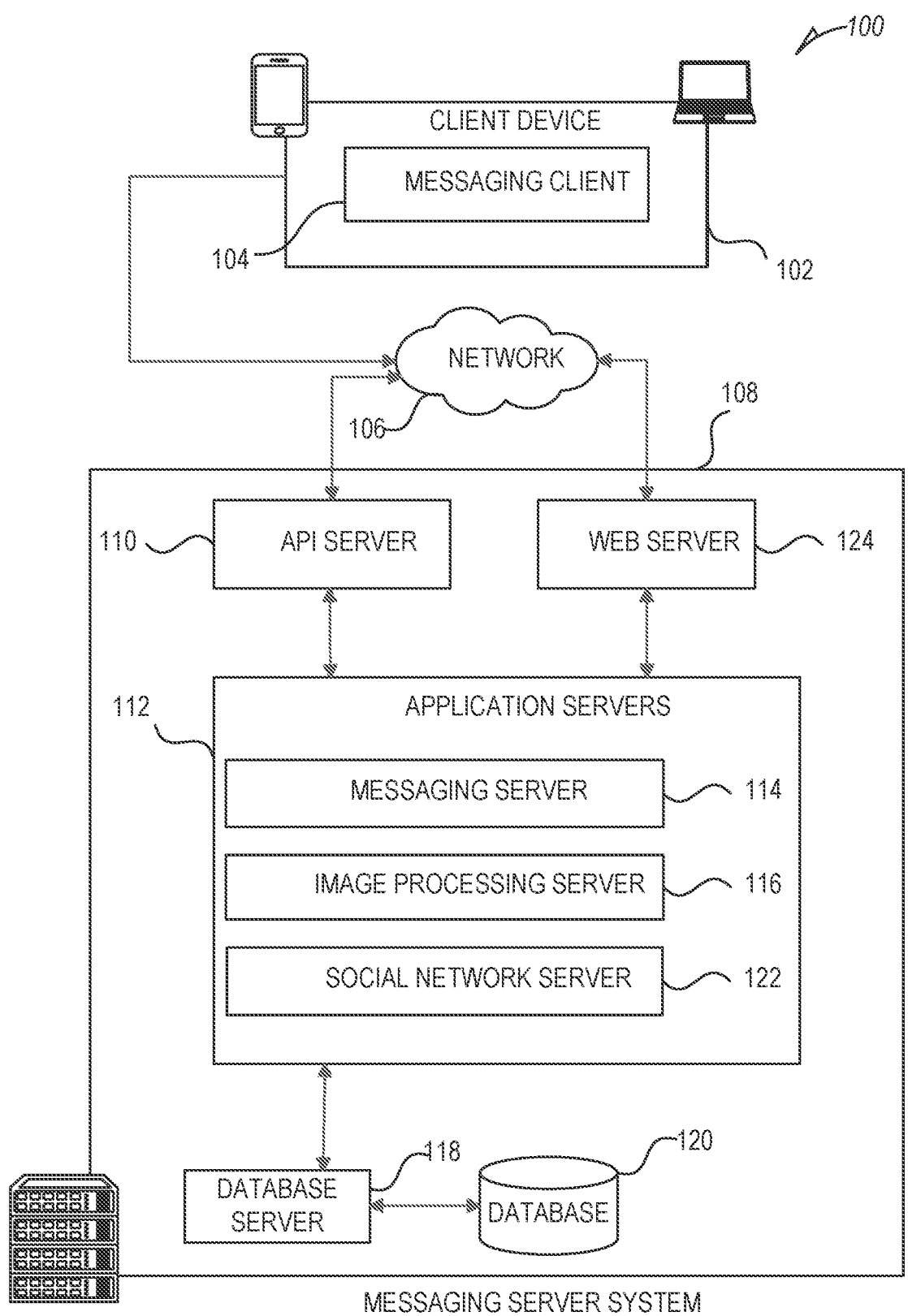
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

It may be difficult for the user to review the content items the user has generated, which may deprive both the user and friends of the user within the messaging system from consuming engaging content items. Organizing the storage of the messaging system so that content items that are engaging may be offered by the messaging system to the users may be difficult due to the large number of content items available and the low number of content items that may be presented to a user.

The messaging system stores the content items along with related information such as signals where signals are actions performed on the content items or data associated with the content items. The messaging system includes rules for when content items should be resurfaced to a user. Rules are associated with determining a time to resurface content items to a user. An example rule includes when content items are generated by the user at a location and time that the messaging system has determined is a sporting event, then resurface the content items generated during the sporting event at some later time, such as a week later, a month later, or another time. The rules may include rules such as to resurface content items once a month, once a year generally, or based on certain triggers.

The content items are processed by a content processing module to determine such things as the identity of objects in an image, the quality of an image, whether an image is part of an event, and so forth. In one example, the messaging system maintains indexes and curated lists that facilitate the content processing module in processing the content items. For example, an index may include objects to recognize within an image and give a tag or name to the object such as a house or dog. A curated list may include national holidays for a country where the user resides so that the content items can be identified as being generated on a national holiday. Each of the items in the indexes and curated list is a signal with an associated weight.

When the system determines to resurface content items to the user, a resurface module generates filters to select a pool of candidate content items for resurfacing to the user. An example filter is that the content item was generated at the location, on the date, and during the time of a sporting event such as a football game. The resurface module scores the pool of candidate content items and selects some of the content items for resurfacing to the user based on the scores. The scores are determined based on weights for each of the signals. The selected content items are presented to the user where the user has the opportunity to view the content items. For example, the system may select ten content items from the last month to resurface to the user where they are presented with a title page with one of the content items highlighted. The user may interact with the resurfaced content items or may ignore them.

The evaluate resurface module examines the user interactions or signals that are performed on the content items that were resurfaced. The evaluate resurface module adjusts the weights associated with the signals to give heavier weights to signals that the user is more interested in. For example, if a user is more likely to interact with resurfaced content items that include a face of a friend the evaluate resurface module will increase the weight for the signal that indicates the content item includes a face of a friend. The increased weight for this signal will mean that it is more likely that a content item with a face of a friend will be selected to be resurfaced to the user. The messaging system maintains weights for each of the users so that users have a custom experience within the messaging system.

The messaging system determines the score for each content item by determining a score for applicable signals then the resurface score associated with a content item is incremented by the score. In this way if the security was compromised no information would be available as to why a score for a content item was high or low. Additionally, the relationship between the scores and the content items may be encrypted so that only the messaging system can associate a score with a content item. In some embodiments, the evaluate resurface module adjusts the weights based on the user interaction with the content items that are resurfaced, but there is not an association of how the score for a content item was derived. The evaluate resurface module then determines how to adjust the weights based on determining common attributes of the content items that were resurfaced and that the user interacted with.

Example embodiments described herein provide solutions to one or more technical problems. One technical problem is how to locate and present content items to the user that the user is likely to find engaging. Example embodiments address this technical problem by determining signals with default weights that enable the messaging system to determine a score for the content items. The weights can be continually adjusted in accordance with how the user engaged with the content items to improve the likelihood that the user will find future content items engaging. This technical solution has the technical effect of enabling the messaging system to organize the content items so that the messaging system only need access content items that are engaging to the user in order to present the user with engaging content items.

Another technical problem is how to determine which content items are engaging without compromising the privacy of the user. Example embodiments address this technical problem by storing a score associated with a content item without identifying information of how the score was derived and by encrypting the association between the score for a content item and content item. The technical effect of this solution is that content items may be analyzed for usage without exposing the usage data of the user to potential hacking.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
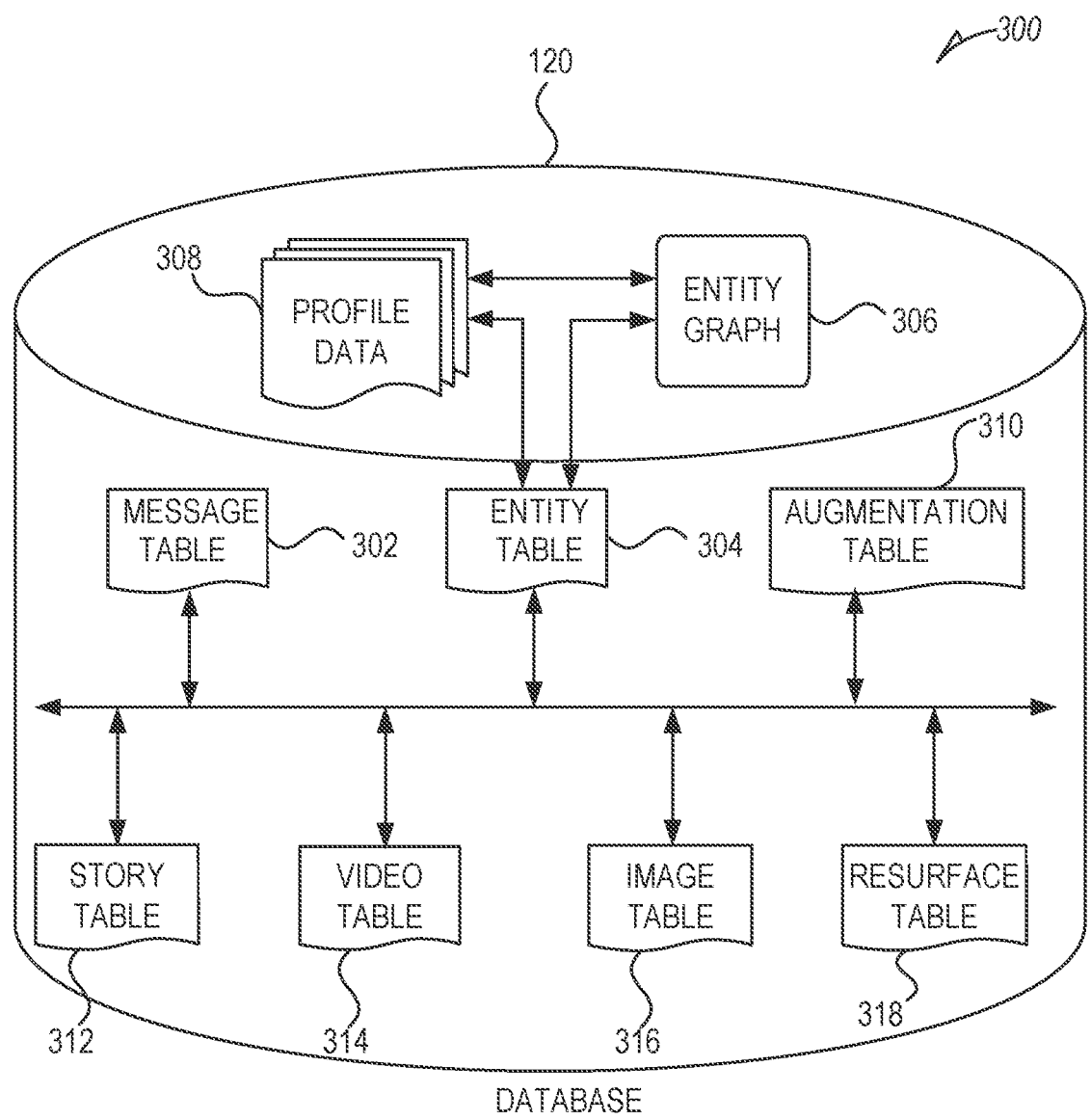
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
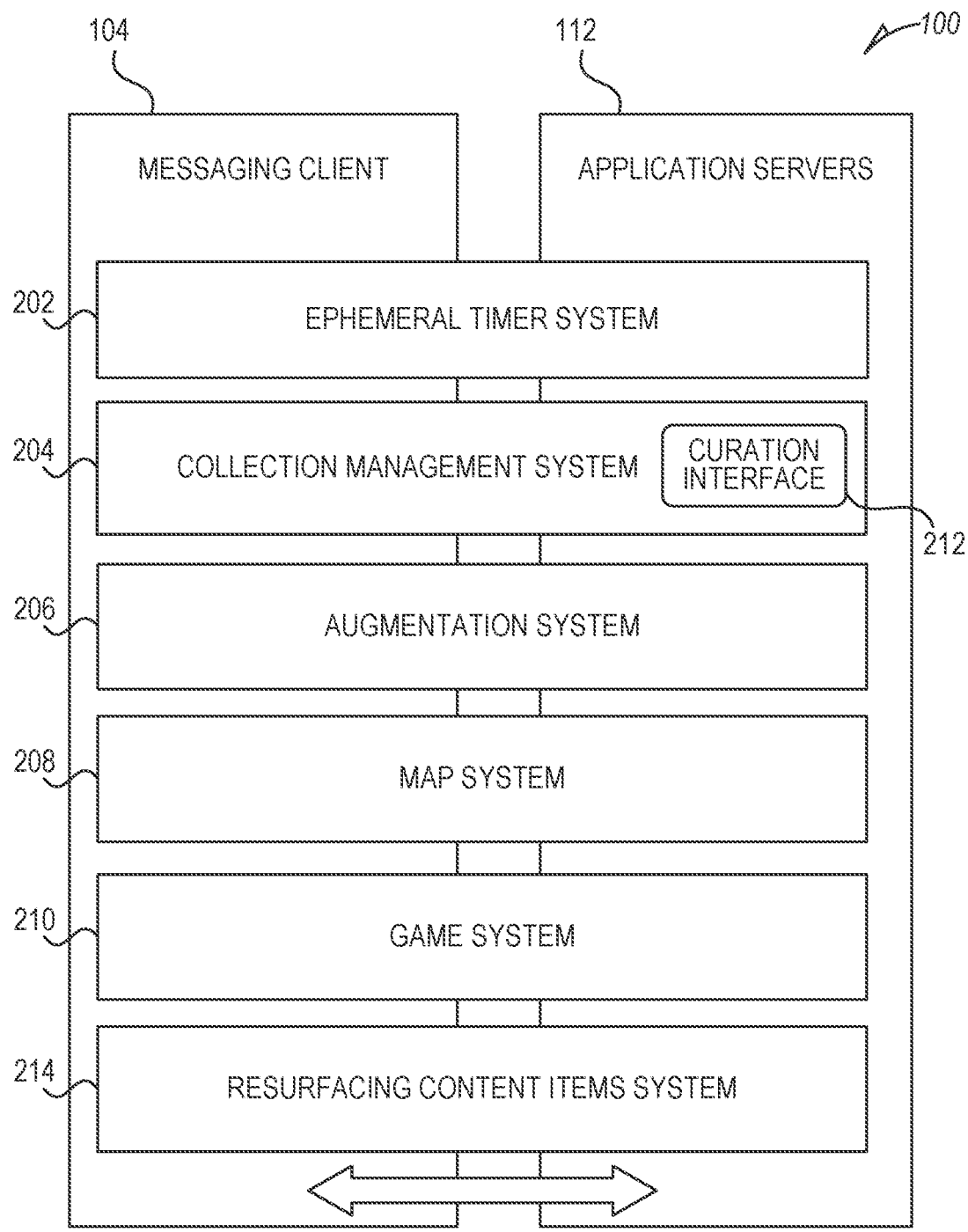
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a resurfacing content items system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The resurfacing content items system 214 provides functionality to resurface a content items 702 or plurality thereof. The resurfacing content items system 214 is disclosed in conjunction with FIGS. 6-11.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314. The database 120 may include resurface table 318, referring to FIGS. 6-9, the indexes 608, curated lists 610, weights 616, filters 618, frequency 620, content items 702 and associated data, user profiles 802, and user interaction metric 910.

Data Communications Architecture

Figure 4:
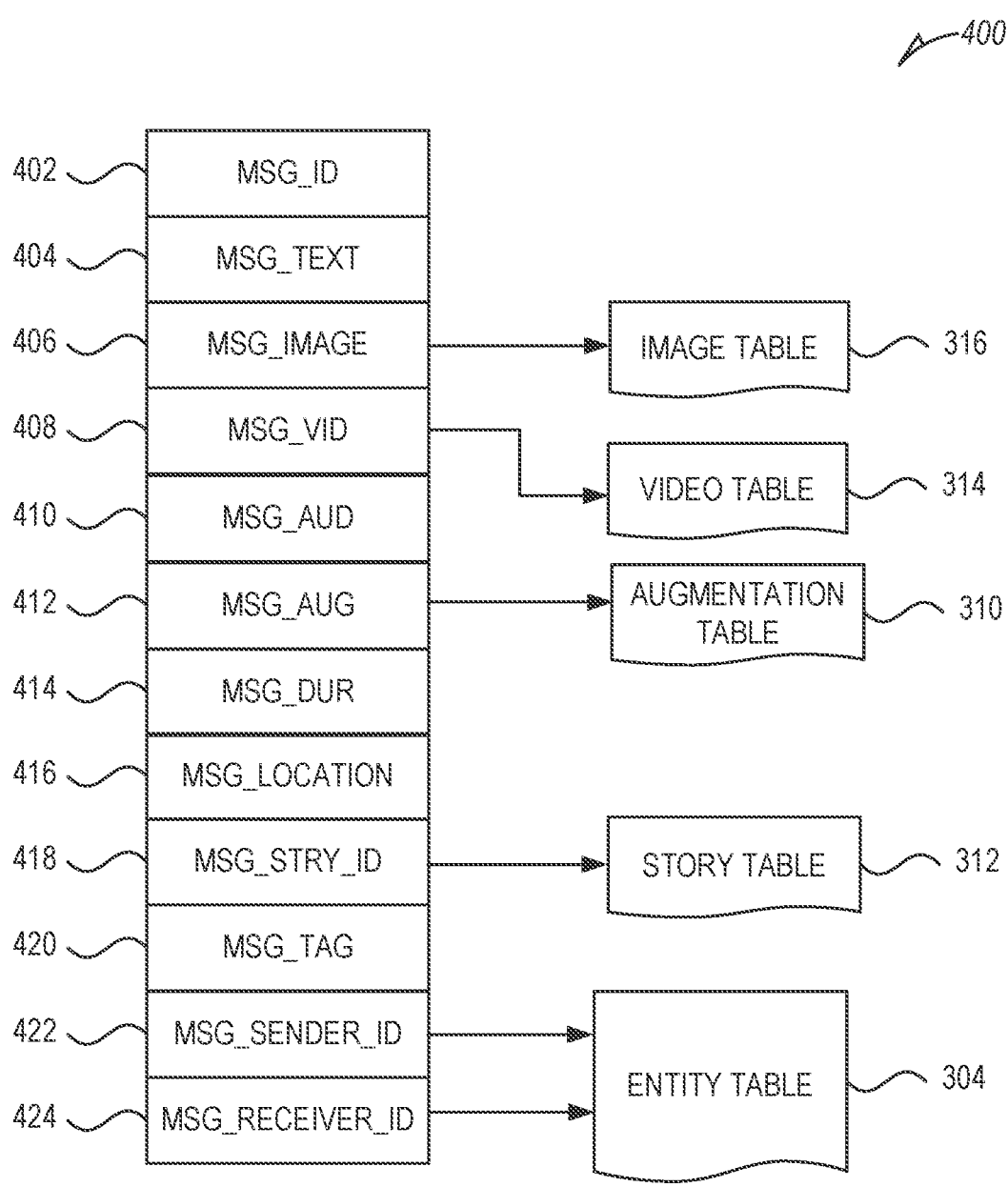
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402: a unique identifier that identifies the message 400. Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
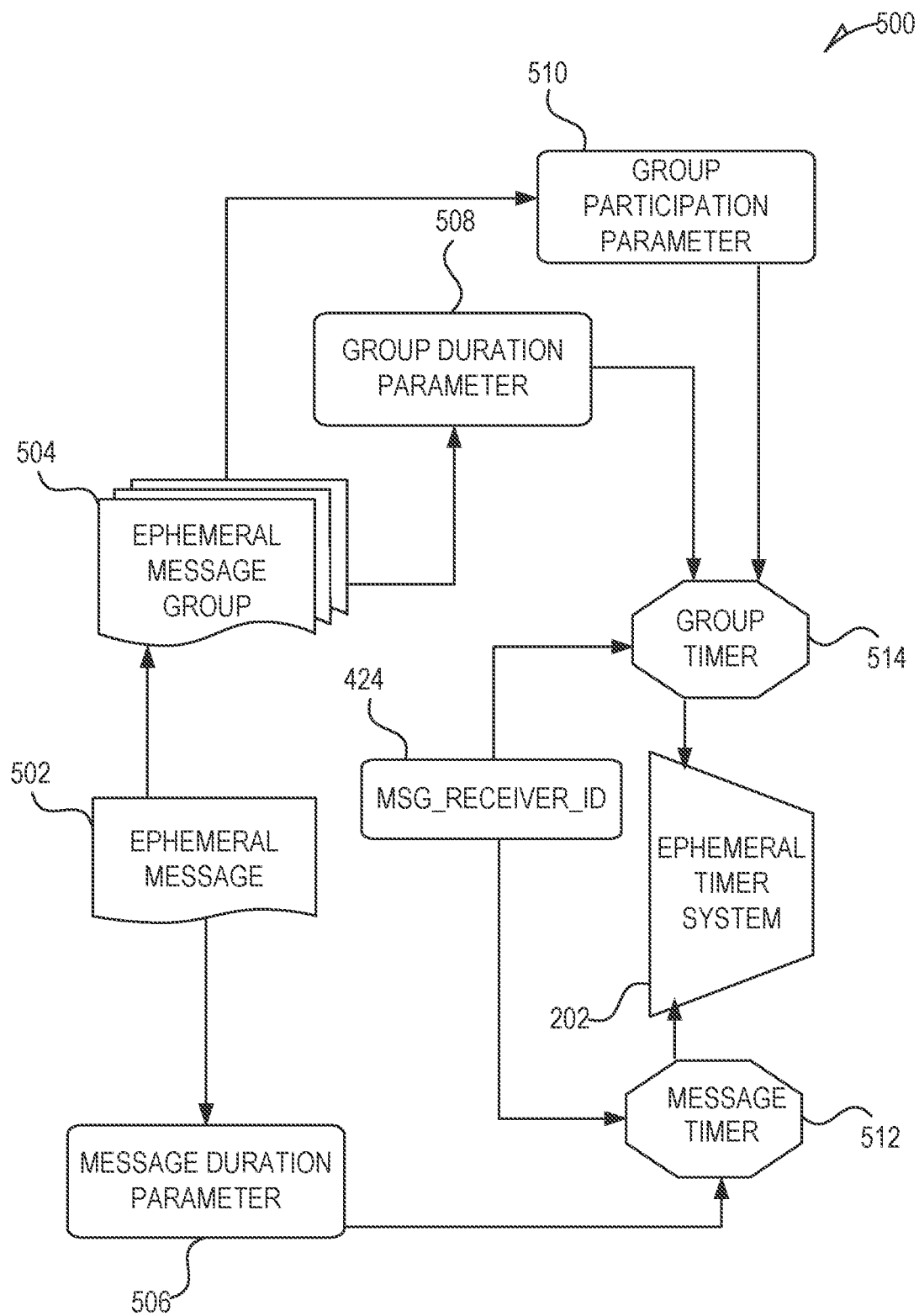
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Messaging System for Resurfacing Content Items

Figure 6:
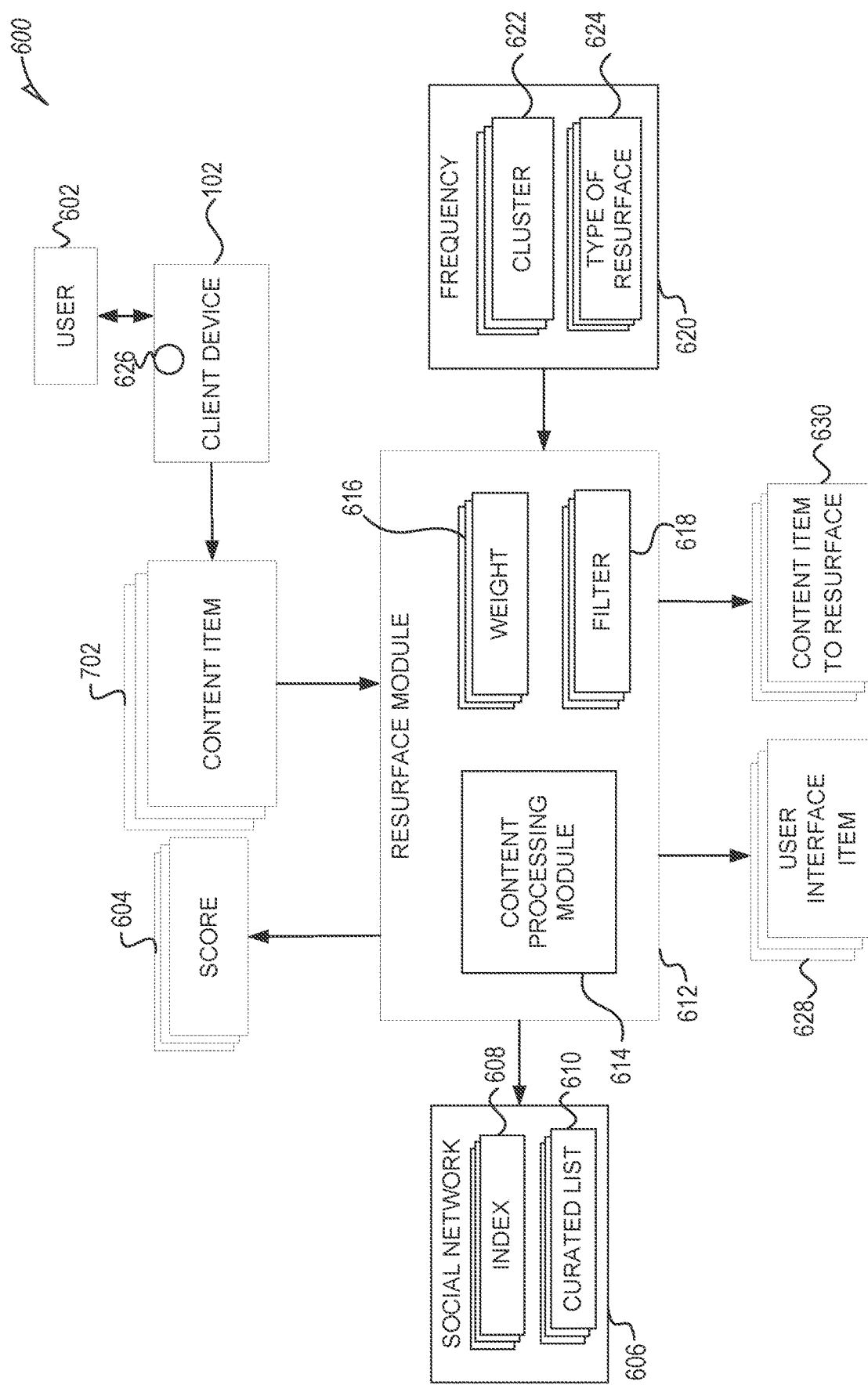
FIG. 6 illustrates a system for resurfacing content items, in accordance with some embodiments.
Figure 7:
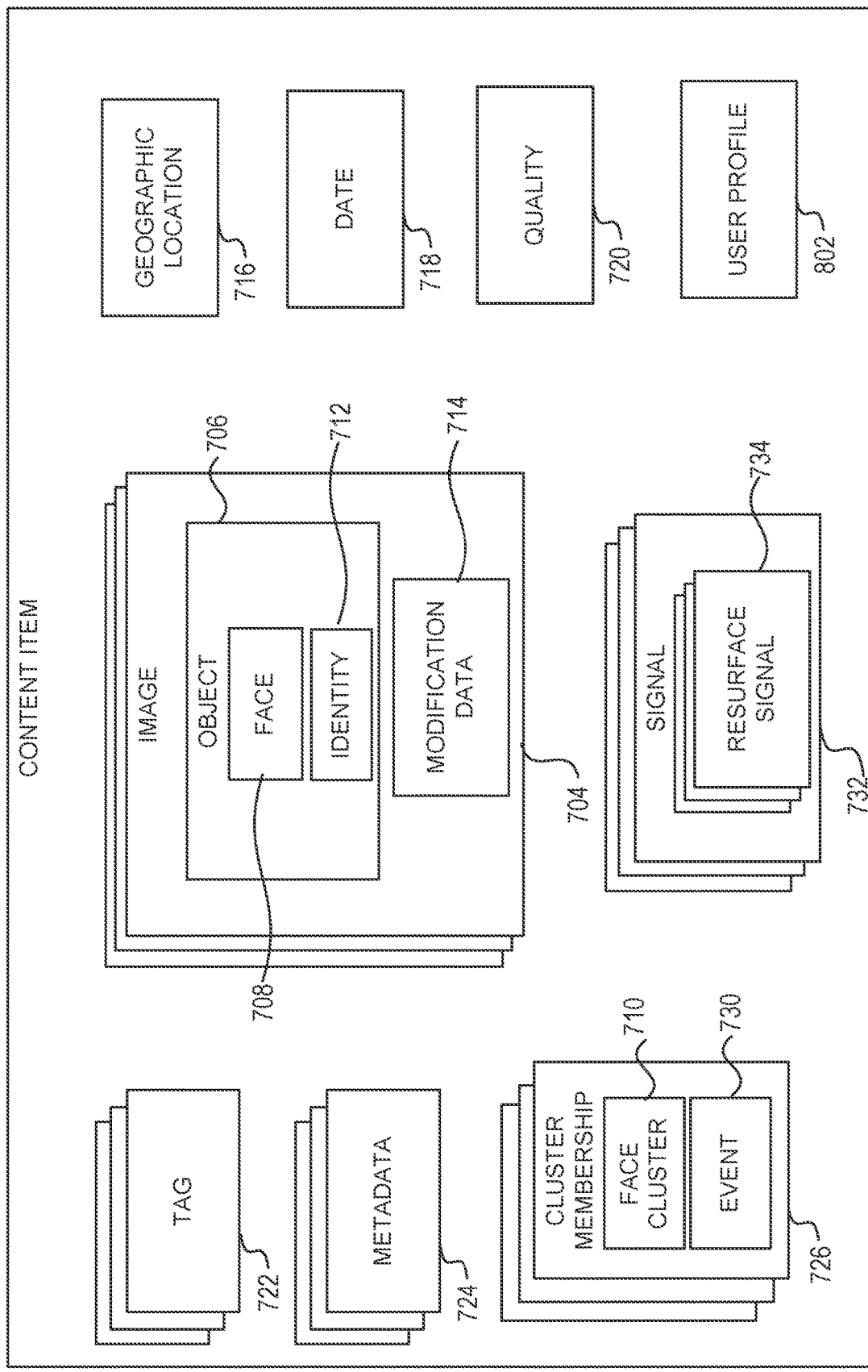
FIG. 7 illustrates a content item, in accordance with some embodiments.
Figure 8:
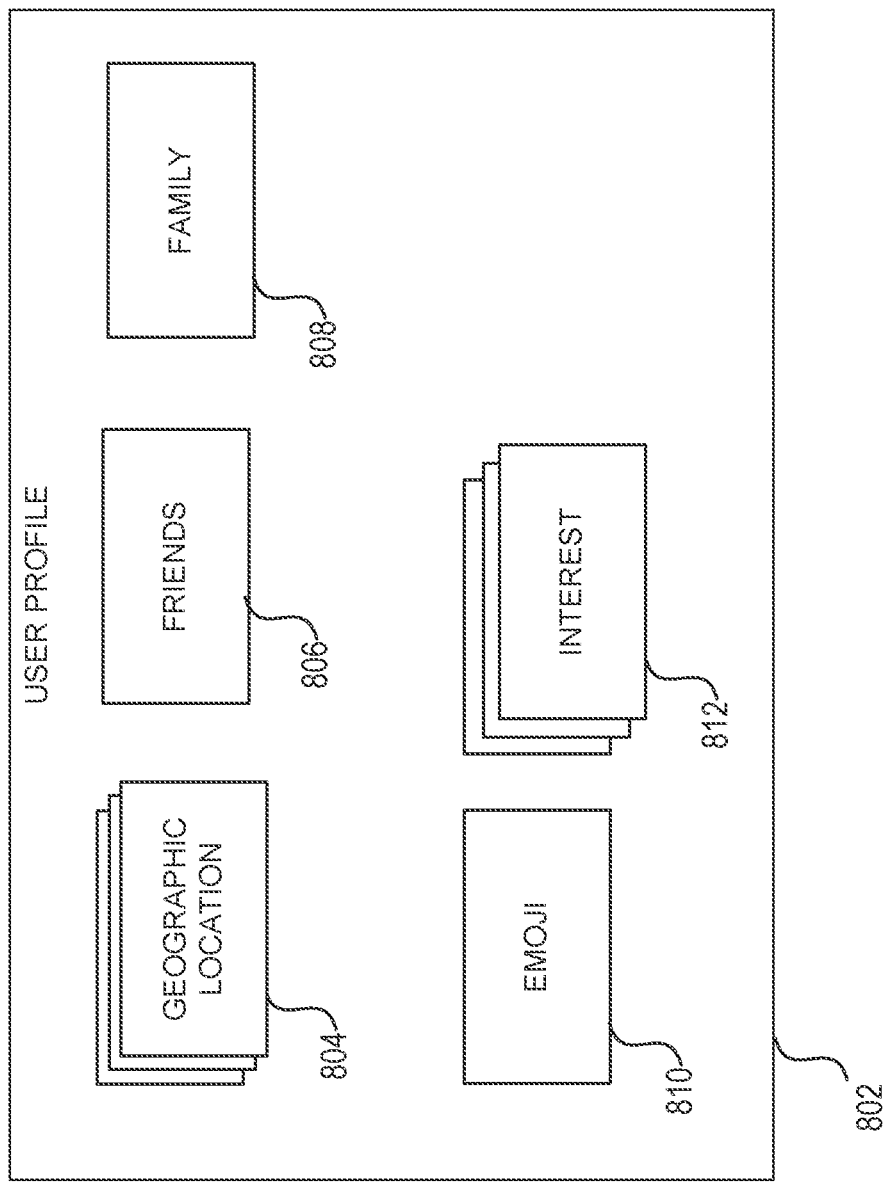
FIG. 8 illustrates a user profile, in accordance with some embodiments.

FIG. 6 illustrates a system 600 for resurfacing content items, in accordance with some embodiments. A user 602 of a client device 102 generates content items 702 and the resurface module 612 selects content items 702 to resurface as content items to resurface 630 based on the weights 616, the filters 618, the social network 606, and the frequency 620. The client device 102 generates the content items 702 from a capturing device such as a camera 626, microphone, three-dimensional infrared capturing, and so forth. Referring to FIGS. 1 and 6, the messaging server system 104, social network server 122, and/or the client device 102 store the content items 702. FIGS. 7 and 8 are discussed in conjunction with FIG. 6. FIG. 7 illustrates a content item 702, in accordance with some embodiments. FIG. 8 illustrates a user profile 802, in accordance with some embodiments.

Figure 9:
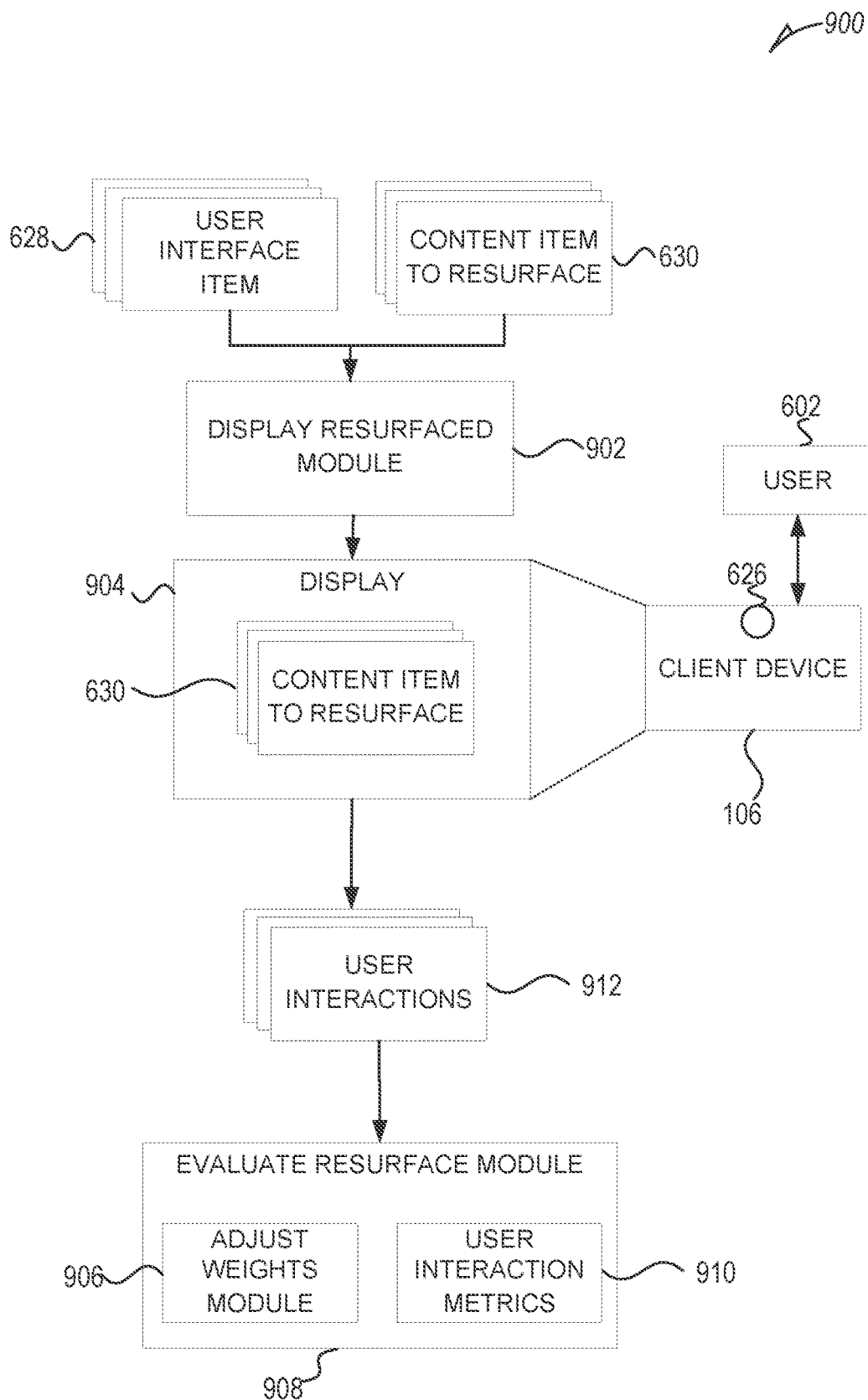
FIG. 9 illustrates a system for resurfacing content items, in accordance with some embodiments.

The display resurfaced module 902 of FIG. 9 presents the content items to resurface 630 to the user 602. The resurface module 612 may also determine user interface items 628 to be presented to the user 602 such as user interface item 628 optional 1112 illustrated in FIG. 11.

The user 602 or another user of the social network 606 performs user actions on the content items 702. The actions of the user 602 are signals 732 where signals 732 are associated with the weights 616 and used to determine the scores 604. Some examples of signals 732 that are user actions include viewing, deleting, saving, sharing to friends, sharing publicly, sending to another user, modifying, associating an application with the content item 702 where the application modifies the content item 702, modifying the content item 702 by adding modification data 714, taking a screenshot, posting the content item 702 to make it available to one or more other users 602, and so forth.

In some embodiments, the metadata 724 includes information about the content item 702. For example, the metadata 724 includes an indication that an image 704 is that of another user 602 that is a friend of the user 602. This indication is a signal 732 with an associated weight 616 that by resurface module 612 to determine the score 604 associated with the content item 702. Other metadata 724 includes indications of emotions of faces in the image 704 such as smiling, laughing, sad, somber, and so forth. Each of the data in the metadata 724 is associated with weight 616. In another example, the date 718 may be a signal 732 with a weight 616 associated with it. The resurface signals 734 are signals 732 that are performed on the content item 702 when the content item 702 is resurfaced as a content item to resurface 630. The resurface signals 734 may be any of the signals 732 for the content item 702.

Figure 10:
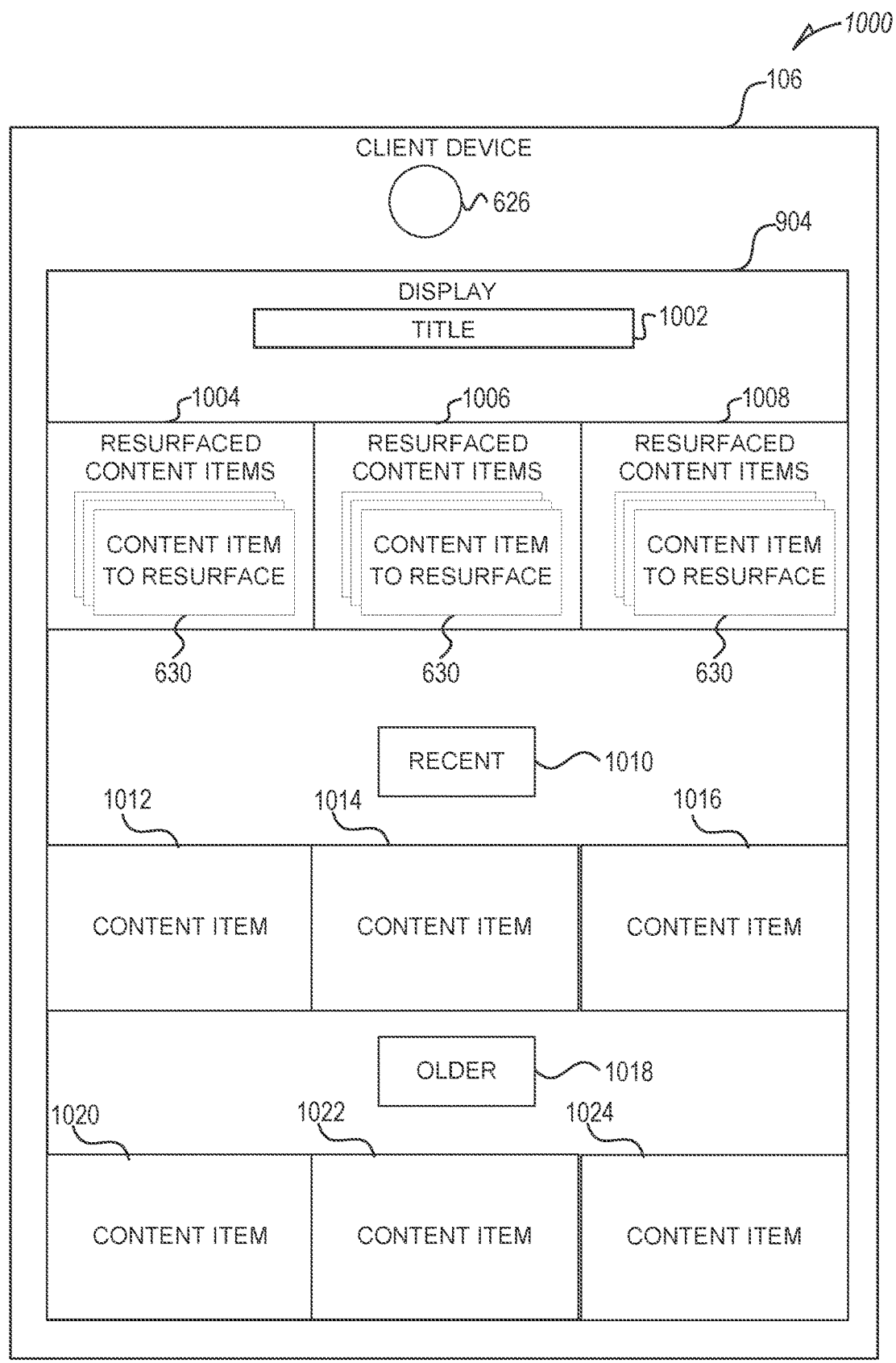
FIG. 10 illustrates an example of resurfaced content items being displayed on the display 904 of the client device.

The weights 616 assign a value to each of the signals 732 and each of the resurface signals 734. In one example, resurface signals 734 are user actions that are performed on the content items to resurface 630. As illustrated in FIG. 10, content items to resurface 630 are presented to the user 602 as resurfaced content items 1004, 1006, and 1008. Example weights 616 include a weight of 2.0 for sharing to friends 806 and a weight of 1.5 for viewing. The number of times a content item 702 is viewed may be a signal 732 and how long the content item 702 is viewed may be a signal 732.

The weights 616 may be associated with a procedure to determine the score 604. The score 604 is termed a resurface score when it indicates a score to determine whether to resurface the content item 702 and be termed a score when it indicates a score for a signal 732 or a current score 604 associated with a content item 702. For example, how long a content item 702 is viewed by the user 602 is a signal 732 with an associated weight 616 where the score 604 is determined as follows for the different viewing times: less than or equal to 3 seconds is scored by 0.5 per second; greater than 3 seconds and less than 15 seconds is scored by a 1 per second; greater than 15 seconds is scored by a 1.5 per second; and, for each minute over one minute an additional score of 20 is added. In another example, a viewing threshold number associated with a weight 616 is used. When a user 602 has viewed a content item 702 greater than the threshold number, a first value is used for the weight 616. When the content item 702 has been viewed less than the threshold number, a second value is used as the weight 616.

In another example, the user 602 sends the content item 702 to another user, which may have a weight 616 of 2. Two is then added to the score 604 associated with the content item 702 sent to the other user 602. In another example, the user 602 posts the content item 702 to a media collection that is accessible to other users. A weight 616 of 3 may be associated with the user action of post, so 3 is added to the score 604 associated with the content item 702 that was posted to the media collection by the user 602.

The data associated with the system 600 is stored on the client device 102 and/or on the social network 606 such as within the database 120 of FIG. 3 in resurface table 318. In some embodiments, resurface module 612 determines scores 604 dynamically as signals 732 occur. In some embodiments, resurface module 612 determines scores 604 periodically such as once an hour, once a day, or once a week for content items 702 associated with a user 602 where the signals 732 are stored. The signals 732 may be purged from the system after a score 604 is determined for the signal 732. In some embodiments, resurface module 612 determines scores 604 when frequency 620 indicates that content items to resurface 630 should be generated.

The resurface module 612 determines the scores 604 and then determines the content items to resurface 630 based on the scores 604. In some embodiments there is a fixed number of content items 702 to select as the content items to resurface 630. In some embodiments the resurface module 612 determines the scores 604 and selects the content items 702 with a top fixed number of scores 604 to be the content items to resurface 630. In some embodiments, there is a threshold score where below the threshold score the resurface module 612 will not select the content item 702 as a content item to resurface 630. In some embodiment, the number of content items 702 to include in content items to resurface 630 may be enlarged if the scores 604 are about a threshold score. In some embodiments, a number of content items to resurface 630 may be a number from one to fifty. In some embodiments, a predetermined number of content items to resurface 630 may be used such as ten.

In some embodiments, the resurface module 612 determines a score for a signal 732 generated and adds the score to a score 604 associated with the content item 702 where the score 604 represents a running total for the associated content item 702. This removes the information about what signals 732 were performed on the content item 702 to generate the score 604. This makes it so that even if the data of the social network 606 were hacked that the signals 732 associated with a content item 702 could not be determined.

The user interface items 628 are items that may be determined by the resurface module 612 to be presented with the content items to resurface 630. As an example, a user 602 may be communicating one-on-one with another user or with a group of users. The resurface module 612 may receive a command to determine content items to resurface 630 that are relevant to the communication. The resurface module 612 may include an indication that a user interface item 628 should be displayed with the content items to resurface 630 where the user interface item 628 enables the user 602 to share the content items to resurface 630 with the other user or group of users.

A content item 702 is associated with a user 602 of the user profile 802 and the content item 702 may be shared with a second user 602 or a copy of the content item 702 may be made and associated with the second user 602. Signals 732 for the content item 702 may include signals generated by the second user 602. For example, if the second user 602 has a copy of the content item 702 sent to him or her from a first user 602, then a signal 732 for the content item 702 includes when the second user 602 views the copy of the content item 702. This signal 732 of when the user 602 views the copy of the content item 702 is recorded as a signal 732 associated with the content item 702. In one example, the social network 606 links the copy of the content item 702 to the original content item 702. Another example signal 732 is when the second user 602 is included in the image 704 of the content item 702 and the content item 702 is sent to the second user 602. The weight 616 may be higher for a user 602 sending a content item 702 to a second user 602 who is captured in the image 704 of the content item 702. For example, the weight 616 for the signal 616 of sending the content item 702 may be two (2) and the weight 616 for sending the content item 702 when the content item 702 includes the face of the person the content item 702 is sent to may be three (3).

In another example, if the user 602 shared a content item 702 with a group of friends then there may be a signal 732 and associated weight 616 for each user action that is performed by one of the group of friends on the shared content item 702. The social network 606 may include an entity graph 306 of FIG. 3. The entity graph 306 may indicate other users that are friends with the user 602 or that the user 602 follows. This information may be used as a signal 732. For example, the content processing module 614 of the resurface module 612 processes the image 704 and identifies people and faces 708 in the image 704. The content processing module 614 may match the identified people in the image 704 to friends of the user 602. The content processing module 614 creates metadata 724 to indicate that the image 704 includes a face 708 of a friend. The metadata 724 is a signal 732 with an associated weight 616.

In some embodiments, there is a signal 732 for sending an image 704 and a signal 732 for sending an image to a user 602 with metadata 724 that indicates the image 704 includes a face 708 of the friend. The weight 616 for the signal 732 of sending an image 704 to a friend where the image 704 includes a face 708 of the friend may be higher than the weight 616 for the signal 732 of sending an image 704 to a friend where the image 704 does not include a face 708 of the friend.

The resurface module 612 determines content items to resurface 630 based on the frequency 620. The frequency 620 may include periodic times such as once a month, once a week, once a year, or another time period for the resurface module 612 to determine content items to resurface 630. The frequency 620 may include special events such as New Year's, birthdays, and so forth. The frequency 620 may be adjusted in accordance with a country that the user 602 lives in or a country the user 602 is from. The frequency 620 may be adjusted by evaluate resurface module 908 of FIG. 9. For example, if the frequency 620 indicates to determine content items to resurface 630 once a week and resurface signal 734 indicates that a user 602 rarely or never interacts with content items to resurface 630 when they are generated once a week, then evaluate resurface module 908 may determine not to determine the content items to resurface 630 once a week or lower a probability that they will be determined once a week. In some embodiments, weights 616 are associated with frequency 620 and evaluate resurface module 908 may adjust the weights 616 to adjust when resurface module 612 generates content items to resurface 630. For example, a weight 616 associated with a frequency 620 of once a week may indicate a probability that the resurface module 612 should determine the content items to resurface 630 once a week.

The cluster 622 may include rules that increase or decrease scores 604 for content items 702. An example rule is that if a day has above a threshold of content items 702 generated by a user 602, then each of the content items 702 generated on that day should receive an score 604 for consideration to be included as a content item to resurface 630. In some embodiments, metadata 724 may be generated that indicates that the content item 702 was generated on a day when above a threshold of content items 702 was generated by the user 602. The metadata 724 is then a signal 732 with an associated weight 616.

In some embodiments, the cluster 622 may include a rule that when above a threshold of content items 702 is generated during one day, then content items 702 from the day will be resurfaced as a separate resurfacing a month, a year, or another time period after the day. The frequency 620 may include one or more timeframes for which content items 702 should be considered for the content items to resurface 630. For example, a timeframe may be since the last time content items to resurface 630 were generated. In another example, the timeframe may be one year. In another example, the timeframe may be a timeframe that is two or three times the frequency 620 used for this resurfacing. For example, if the frequency 620 is monthly, then content items 702 will be considered from the last two or three months.

In some embodiments, resurface module 612 determines the scores 604 and selects the content items 702 based on clusters 622. For example, for a monthly resurface each three days is treated as a bucket. The top one or more content items 702 from each bucket is selected to become a content item to resurface 630. In some embodiments, the cluster 622 may indicate a rule for a location where the content items 702 were generated. For example, referring to FIGS. 6-8, the geographic location 716 of the content item 702 is compared with a primary geographic location 804 of the user 602, and content items 702 that are in the primary geographic location 804 are put into a bucket. The frequency 620 may have a rule that if the user 602 generates above a threshold of content items 702 at a same geographic location 716 during a timeframe that content items to resurface 630 should be generated from those content items 702. For example, one week after the user 602 generates above a threshold of content items 702 at a same geographic location 716, resurface module 612 is to generate content items to resurface 630 from those content items 702. The type of resurface 624 may indicate a type such as periodic, geographic, large number generated, or in response to an event such as the user 602 messaging another user 602.

When the resurface module 612 determines the content items to resurface 630, it may select a timeframe for content items 702 to determine their scores 604. One or more filters 618 may be applied where one filter 618 may be for date 718. For example, for a monthly content items to resurface 630 the filter 618 may indicate content items 702 with a date 718 from a current date to one month previously. The resurface module 612 may use or generate filters 618 to search through the content items 702 that fit the rules in frequency 620. The filters 618 may include a timeframe, a date, a quality, and any data that is associated with the content item 702.

For example, a signal 732 may be an event such as a sporting event, and the date 718 may be compared with a timeframe associated with the event. In some embodiments, frequency 620 includes a cluster 622 rule that indicates that when geographic locations 716 of content items 702 are different, then the content items 702 may be clustered differently. For example, if the geographic locations 716 of the content items 702 are the same and a primary geographic location of the user 602, then content items 702 are clustered together according to a default rule such as every three days forms a cluster from which to select the content items 702 with the top scores. And, if the geographic locations 716 of the content items 702 are different, and a geographic location 716 of some of the content items 702 is the same and different than the primary geographic location of the user 602, then cluster all the content items 702 from this geographic location 716 in one cluster. As an example, if a user 602 generates content items 702 at a geographic location 716 that is a primary geographic location of the user 602, then a cluster may be every three days for selecting content items to resurface 630. And, if the user 602 travels around Europe, then content items 702 generated in Paris would be clustered together and content items 702 generated in London would be clustered together. There may be multiple levels of clustering. For example, if the user 602 were to go to a geographic location 716 in London that was an event 730 such as a music concert, then all the content items 702 may be clustered together for London and all the content items 702 taken at the event 730 may be clustered together separately from the London content items 702.

The cluster membership 726 may indicate clusters that the content item 702 is a member of such as with other content items 702 that are related to the content item 702 where the other content items 702. The content processing module 614 may determine the cluster membership 726 of FIG. 7 based on geographic location 716, date 718, and information from the social network 606. For example, the curated list 610 may include lists of events 730 that may be compared with the geographic location 716 of a content item 702. The content processing module 614 then may classify the content item 702 as being associated with the event 730. The curated lists 610 may include other lists such as museums, national parks, a list of objects, and so forth that may be searched to classify the event 730 of the content item 702. The cluster 622 of frequency 620 may include rules such as if there is a content item 702 generated with a geographic location that matches an event 730 of the curated list 610, then content items to resurface 630 should be generated with content items 702 generated during that event 730. The curated lists 610 may further include lists of tags 722 that may be used by the content processing module 614 to determine tags 722 to assign to the content item 702. A curated list 610 of tags 722 may include "dog", "food", "cat", "selfie", "car", "hair", "person", "makeup", "face", "girl", "sky", "glasses", "winter", "art", "puppy", "sneeuw", "doll", "drink", "man", "male", "tattoo", "jog", "jeans", "outdoor", "hamster", "beard", "bird", "cap", "concert", "hat", "clothes", "pool", "book", "sand", "kitty", "piano", "computer", "boot", "tv", "woman", "fish", "tree", "necktie", "carpet", "horse", "shoe", "spring", "hunting dog", "nourriture", and "dress". Each of the tags 722 and cluster membership 726 may be associated with a signal 732 and weight 616. The frequency 620 may include rules that references indexes 608 or curated lists 610. The indexes 608 and/or curated lists 610 may be used to assign initial weights 616 to the signals 732.

The indexes 608 are lists of information that may be used by the content processing module 614 and/or the resurface module 612 to classify or score 604 the content item 702. The indexes 608 include an emotions index such as love, laughs, sad, and dislike that may be used to classify the content item 702 in the metadata 724 by content processing module 614. The indexes 608 may include other indexes such as themes such as food, animals, music, travel, and so forth. The indexes 608 may include holidays such as Thanksgiving, Independence Day, other countries holidays, and so forth. The indexes 608 may include locations, which may be similar to the curated list 610. The indexes 608 may include caption indexes of captions or text captions that are curated keywords for modification data 714. The indexes 608 may include sticker indexes of stickers that are modification data 714. The indexes 608 may include geofilter indexes that include locations of places with latitude and longitude that may be matched with the geographic location 716. The indexes 608 may include bitmoji indexes that include curated bitmojis associated with users 602. The indexes 608 may include an index of applications to modify content items 702. The application to modify content items 702 may be applications that modify the image 704 and be considered modification data 714. The indexes 608 may include a screenshot index of content items 702 that have been screenshotted. The content processing module 614 uses the indexes 608 to process the content item 702 and classify or generate cluster membership 726, event 730, metadata 724, tags 722, modification data 714, face cluster 710, and geographic location 716, each of which is a signal 732 with an associated weight 616.

The content processing module 614 is trained to identify the items in the indexes 608 and curated lists 610. For example, the content processing module 614 is trained in image processing to identify tags 722 of the curated list 610 within an image 704 such as horses and smiling faces.

The resurface module 612 may apply a filter 618 to determine which of the content items 702 to consider for determining their scores 604. The filter 618 may be set up based on rules that are indicated by frequency 620. The resurface module 612 may then cause the content processing module 614 to process the content items 702 and then the resurface module 612 may determine scores 604 for those content items 702 based on the signals 732 and weights 616. Filters 618 may include geographic filters, timeframe filters, content filters, and so forth. Filters 618 may include any of the information associated with the content items 702 such as a tag 722, metadata 724, a cluster membership 726, a signal 732, modification data 714, geographic location 716, date 718, quality 720, and user profile 802 information. For example, when the user 602 is texting a friend that is also a user 602 on the social network 606, a filter 618 may be applied for a timeframe of since the last time the user 602 texted the same friend and for content items 702 that include the face 708 of the friend. If no content items 702 are left after the filtering, then the resurface module 612 may broaden the filters 618 or simply not generate content items to resurface 630.

In another example, the filter 618 may be for happy content items 702 generated in the last seven days. In another example, the filter 618 may be for content items 702 generated in the last ten (10) days that include a face cluster 710 that includes at least three (3) family members of the user 602.

The content processing module 614 may process the content items 702 to determine a quality 720. For example, the content processing module 614 may determine whether an image 704 is in focus, whether an image 704 is over or under exposed, and so forth. The quality 720 may be used in a filter 618 such as to exclude poor quality 720 content items 702 or to include only high-quality content items 702.

The content items 702 may be a single image 704 or a series of images 704 that may be termed a video or another name. The content processing module 614 may process each of the content items 702 in the series of images 704 and the resurface module 612 may determine scores 604 for each of the series of images 704 or for the entire series of images 704. A filter 618 may select for either single images 704 or series of images 704. In some embodiments, the content items 702 may be a different type of content such as a sound recording, a text file, and so forth.

Referring to FIG. 8, the user profile 802 may include geographic location 804, friends 806, family 808, emoji 810, and interests 812. The geographic location 804 may indicate one or more geographic locations that are associated with the user 602 such as a home, office, frequency visited places, stores visited, and so forth. Friends 806 may indicate other users 602 of the social network 606 that the user 602 is friends via the social network 606. Friends 806 may include associates that are other users 602 that the user 602 interacts with but is not formally friends with. Emoji 810 may be an emoji that is associated with the user 602 and may be registered to the user 602 via the social network 606. Interests 812 may indicate interests that have been expressed by or inferred about the user 602 such as horseback riding, travel, pets, dogs, cats, and so forth. The signals 732 may include signals that reference one or more of the data fields of the user profile 802. For example, content processing module 612 may process the image 704 and determine a tag 722 of the image 704 to be horseback riding. In an example, a signal 732 with an associated weight 616 includes the condition that a tag 722 matches an interest 812. For example, the interest 812 may be horseback riding and the tag 722 may be horseback riding.

Figure 11:
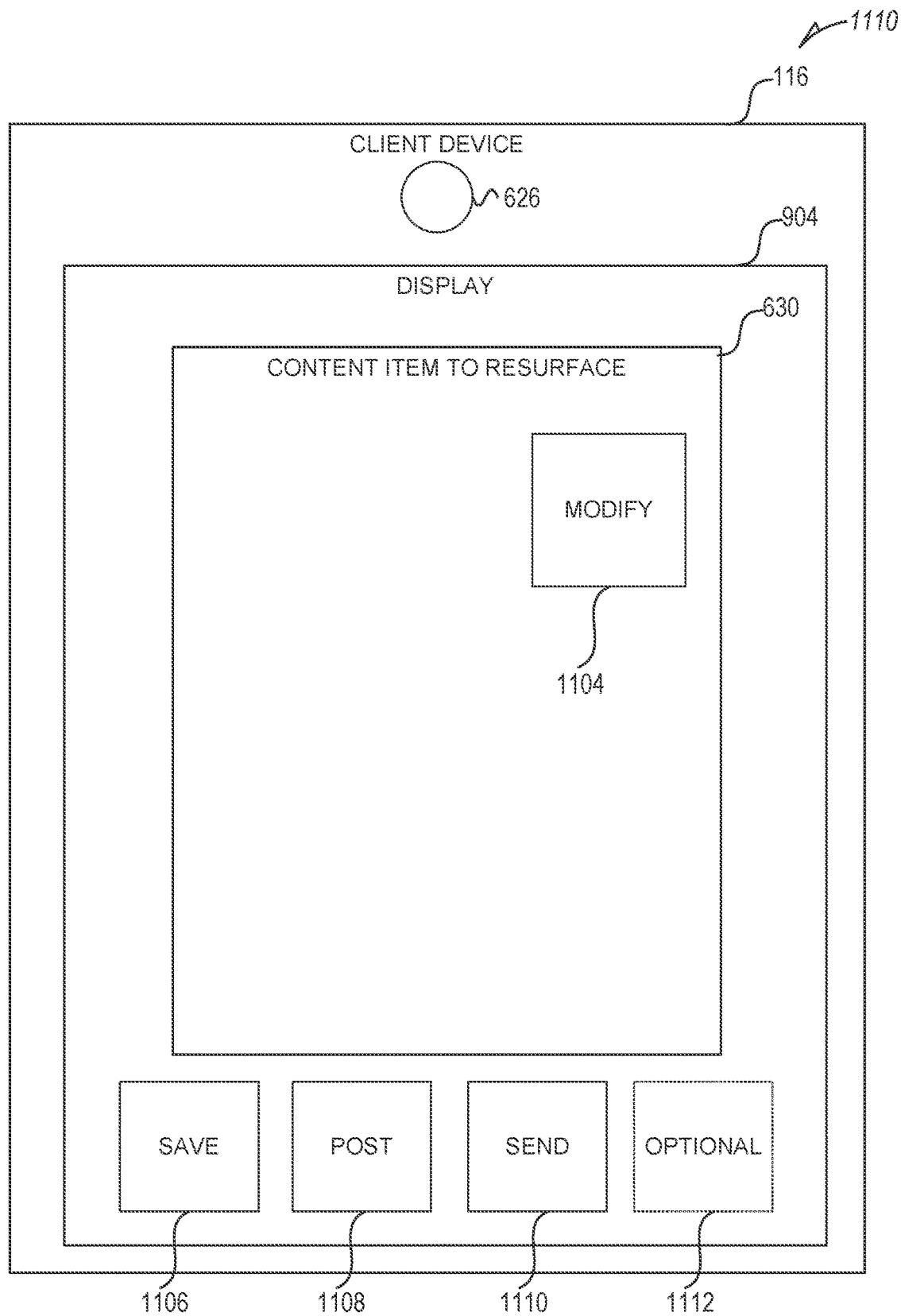
FIG. 11 illustrates a content item to resurface being displayed on the display of the client device, in accordance with some embodiments.

FIGS. 9, 10, and 11 are described in conjunction with one another. FIG. 9 illustrates a system 900 for resurfacing content items, in accordance with some embodiments. The display resurfaced module 902 takes the content items to resurface 630 generated by the resurface module 612 of FIG. 6 and displays them on the display 904 of the client device 102 for the consumption of the user 602.

FIG. 10 illustrates an example of resurfaced content items 1004, 1006, 1008 being displayed on the display 904 of the client device 102. As illustrated in FIG. 10, the resurfaced content items 1004 are content items to resurface 630 grouped together with either one content item to resurface 630 being displayed or a title page being displayed. The resurfaced content items 1004, 1006, 1008 may be part of a carousel that can be scrolled left and right for additional resurfaced content items 1004, 1006, 1008, in accordance with some embodiments. In some embodiments, a selection of one of the resurfaced content items 1004, 1006, 1008, will display one or more content item to resurface 630 such as is displayed in FIG. 11.

The title 1002 indicates the subject of what is being displayed on the display 904. For example, the title 1002 may be "Memories." A menu (not shown) may be displayed or available that enables the user 602 to select different content to view, in accordance with some embodiments. For example, the menu may indicate "Images", "Stories", "Camera", and so forth. The resurfaced content items 1004, 1006, 1008 may be part of a carousel user interface item that may be scrollable by, for example, swipes left or right of a finger. Recent 1010 indicates content items 1012, 1014, and 1016 that were recently added or generated. Recent 1010 may include a title such as "Recently Added." Older 1018 indicates that content items 1020, 1022, 1024 that were generated before recent 1010. Older 1018 may include an indication of a date such as "April 2020." The resurfaced content items 1004, 1006, 1008 may be displayed on the display 904 of the client device 102 in a different way than what is shown as an example in FIG. 10.

FIG. 11 illustrates a content item to resurface 630 being displayed on the display 904 of the client device 116, in accordance with some embodiments. In this example a user 602 has selected resurfaced content items 1004 of FIG. 10 and the content item to resurface 630 of FIG. 11 may be a first content item to resurface of the content items to resurface 630 of resurfaced content items 1004.

The user 602 may be presented with user interface items such as modify 1104, save 1106, post 1108, send 1110, and optional 1112. The post 1108 user interface item will add the content item to resurface 630 to an existing or new group of content items where a group of content items is a collection of content items 630 for sharing publicly or with friends 806 and/or family 808. The send 1110 user interface item enables the user 602 to send the content item to resurface 630 to one or more other users 602. The optional 1112 user interface item may be a user interface item 628 as disclosed in conjunction with FIG. 6. In some embodiments, content item to resurface 630 is one of the content items to resurface 630 as disclosed in FIG. 6 and a user 602 may perform an action such as swiping left or right to view a next content item to resurface 630 of the group of content items to resurface 630.

Returning to FIG. 9, the evaluate resurface module 908 evaluates the user interactions 912 performed on the content items to resurface 630 to determine user interaction metrics 910. In example embodiments, the user interaction metrics 910 include whether the user 602 selected the resurfaced content items 1004, 1006, 1008, such as is disclosed in FIG. 10, to view the content items to resurface 630. Additional user interaction metrics 910 may include a duration that a content item to resurface 630 was viewed, user interface actions performed on the content item to resurface 630 such as modify 1104, save 1106, post 1108, send 1110, and optional 1112. The user interaction metrics 910 may include actions performed on the content item to resurface 630 performed by other users. For example, the user 602 may add the content item to resurface 630 to a collection of content items 702 that is made available to one or more other users 602. The actions performed on the content item to resurface 630 may contribute to the user interaction metrics 910. User interaction metric 910 may include a completion rate such as a percentage of the content items to resurface 630 that the user 602 viewed. The user interaction metrics 910 may include any of the signals 732 for a content item 702 as disclosed herein.

The adjust weights module 906 evaluates the user interaction metrics 910 and determines which signal 732 of content items 702 that the user 602 is most interested in. The adjust weights module 906 then adjusts the weights 616 (FIG. 6) so that the resurface module 612 may be more likely to select content items to resurface 630 that the user 602 will interact with or is interested in. In example embodiments, the adjust weights module 906 performs statistical analysis such as logistical regression to determine which weights to adjust. Each user 602 may have associated weights 616, which enables the users 602 experience within the social network 606 to be customized.

In some embodiments, the resurface module 612 maintains two scores 604 associated with a content item 702. One score 604 is for scores generated from resurface signals 734 and the other score 604 is from signals 732. When a signal 732 or resurface signal 734 is generated, then the resurface module 612 determines a score 604 for the signal 732 or resurface signal 734 and adds it to a corresponding score 604 where the corresponding score 604 keeps a running total. In this way the information of how the scores 604 was achieved is not available. In some embodiments, the association between the content items 702, scores 604, and weights 616 is encrypted so that an encryption key is necessary to determine which set of weights 616 and scores 604 is associated with a content item 702 or user 602. In some embodiments, the adjust weights module 906 evaluates the scores 604 associated with the content items to resurface 630 to determine how to adjust the weights 616. The signals 732 and resurface signals 734 are not available to the adjust weights module 906 because they were not saved, in accordance with some embodiments. In some embodiments, the resurface signals 734 are saved temporarily and the signals 732 are not stored.

In some embodiments, curated list 610 includes a list of signals 732 for the adjust weights module 906 to adjust the associated weights 616. In one embodiment, the list includes duration of viewing, a type of media of the content item 702 such as image, video, video with sound, video without sound, information regarding whether the content item 702 was captured with a front camera or back camera of the client device 102, the type of modification data 714, the identity 712 of objects 706 within the content item 702 such as dog or house, and so forth. The objects 706 that are identified may be termed identified objects.

Figure 12:
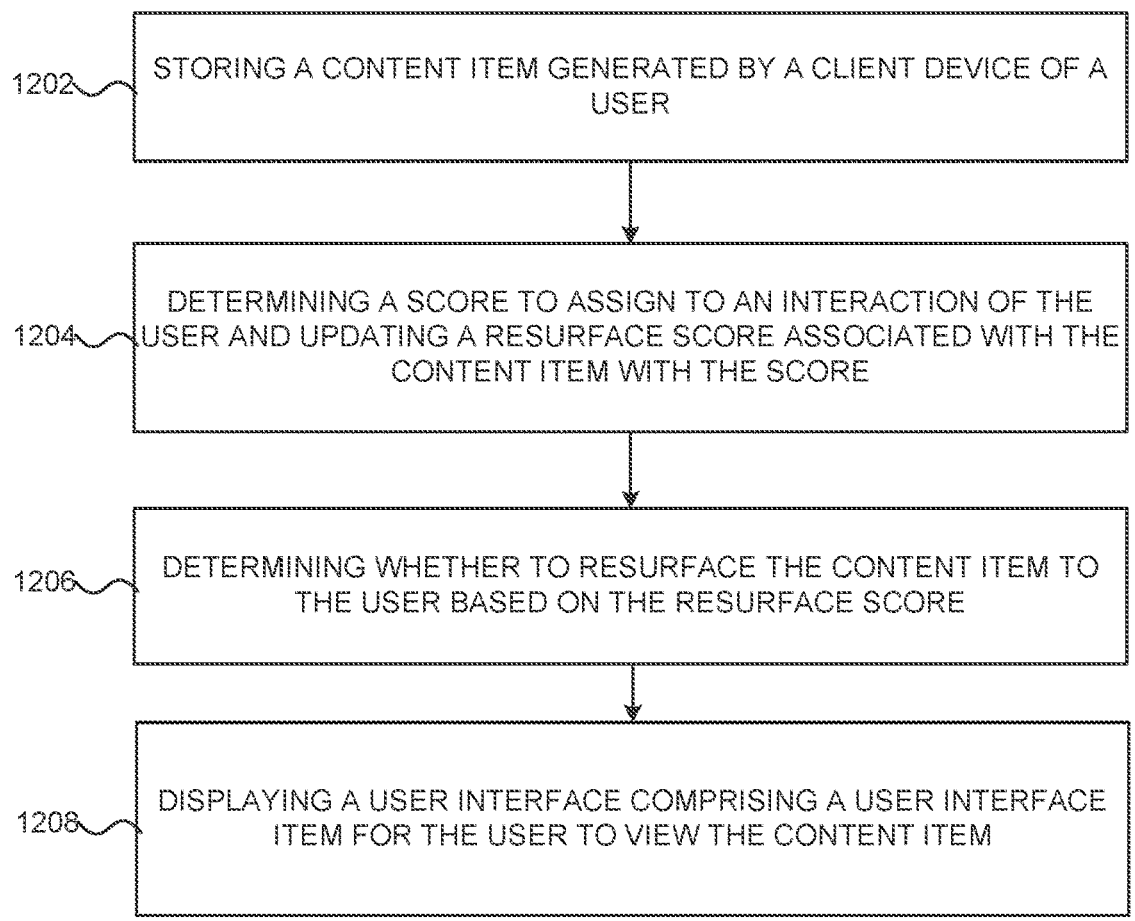
FIG. 12 illustrates a method for resurfacing content items, in accordance with some embodiments.

FIG. 12 illustrates a method 1200 for resurfacing content items, in accordance with some embodiments. The method 1200 begins at operation 1202 with storing a content item generated by a client device of a user. The user may be associated with a messaging system. For example, referring to FIG. 6, the user 602 generates content item 702 using client device 102. In some embodiments, operation 1202 includes storing a content item generated by a client device of a user, where the user is associated with the messaging system.

The method 1200 continues at operation 1204 with determining a score to assign to an interaction of the user and updating a resurface score associated with the content item with the score. For example, referring to FIG. 6, resurface module 612 may determine a score 604 for a user interaction with the content item 702 where the user interaction may be, referring to FIG. 7, a signal 732. In some embodiments, operation 1204 includes in response to the user performing an interaction with the content item, determining a score to assign to the interaction and updating a resurface score associated with the content item with the score.

The method 1200 continues at operation 1206 with determining whether to resurface the content item to the user based on the resurface score. For example, resurface module 612 examines the content item 702 and scores 604 and determines whether to make the content item a content item to resurface 630 as discussed in conjunction with FIG. 6.

The method 1200 continues at operation 1208 with in response to determining that the content item should be resurfaced to the user, displaying, on a display of the client device, a user interface comprising a user interface item for the user to view the content item. For example, if the content item is selected to be a content item to resurface 630, then, referring to FIG. 9, display resurfaced module 902 displays the content item to resurface 630 on the display 904 of the client device 102 of the user 602. In some embodiments, operation 1208 includes displaying, on a display of the client device, a user interface comprising a user interface item for the user to view the content item.

Machine Architecture

Figure 13:
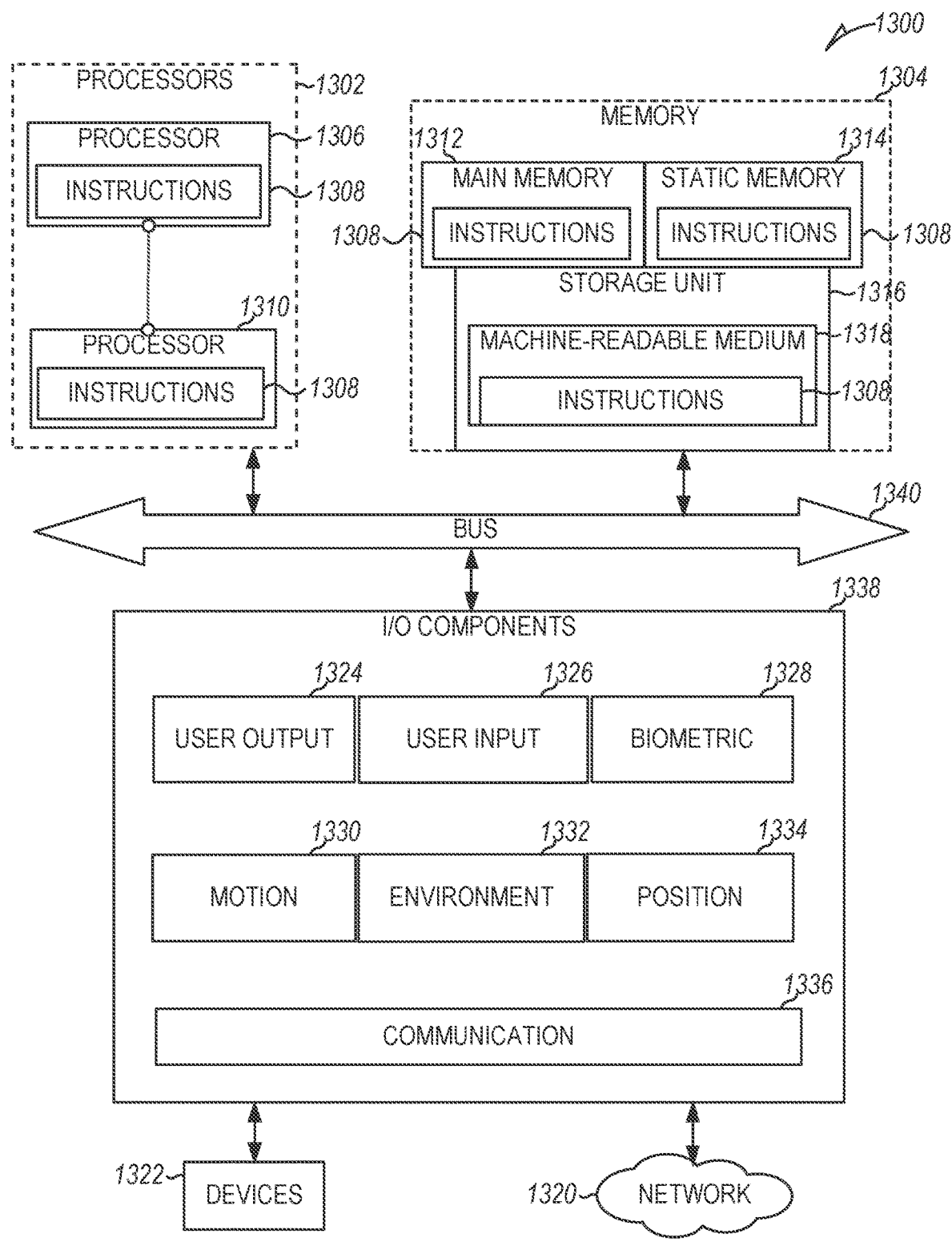
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein. The machine 1300, for example, may comprise the client device 102 or any one of a number of server devices forming part of the messaging server system 108. In some examples, the machine 1300 may also comprise both client and server systems, with certain operations of a particular method or algorithm being performed on the server-side and with certain operations of the particular method or algorithm being performed on the client-side. The machine 1300 may be termed a computing apparatus.

The machine 1300 may include processors 1302, memory 1304, and input/output I/O components 1338, which may be configured to communicate with each other via a bus 1340. The processors 1302 may be termed computer processors, in accordance with some embodiments. In an example, the processors 1302 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single-core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1340. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the Processor's cache memory), or any suitable combination thereof, during execution thereof by the machine 1300.

The I/O components 1338 may include a wide variety of components to receive input, provide output, produce output, transmit information, exchange information, capture measurements, and so on. The specific I/O components 1338 that are included in a particular machine will depend on the type of machine. For example, portable machines such as mobile phones may include a touch input device or other such input mechanisms, while a headless server machine will likely not include such a touch input device. It will be appreciated that the I/O components 1338 may include many other components that are not shown in FIG. 13. In various examples, the I/O components 1338 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1338 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1338 further include communication components 1336 operable to couple the machine 1300 to a network 1320 or devices 1322 via respective coupling or connections. For example, the communication components 1336 may include a network interface Component or another suitable device to interface with the network 1320. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF425, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1312, static memory 1314, and memory of the processors 1302) and storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 may be transmitted or received over the network 1320, using a transmission medium, via a network interface device (e.g., a network interface component included in the communication components 1336) and using any one of several well-known transfer protocols (e.g., hypertext transfer protocol (HTTP)). Similarly, the instructions 1308 may be transmitted or received using a transmission medium via a coupling (e.g., a peer-to-peer coupling) to the devices 1322.

Software Architecture

Figure 14:
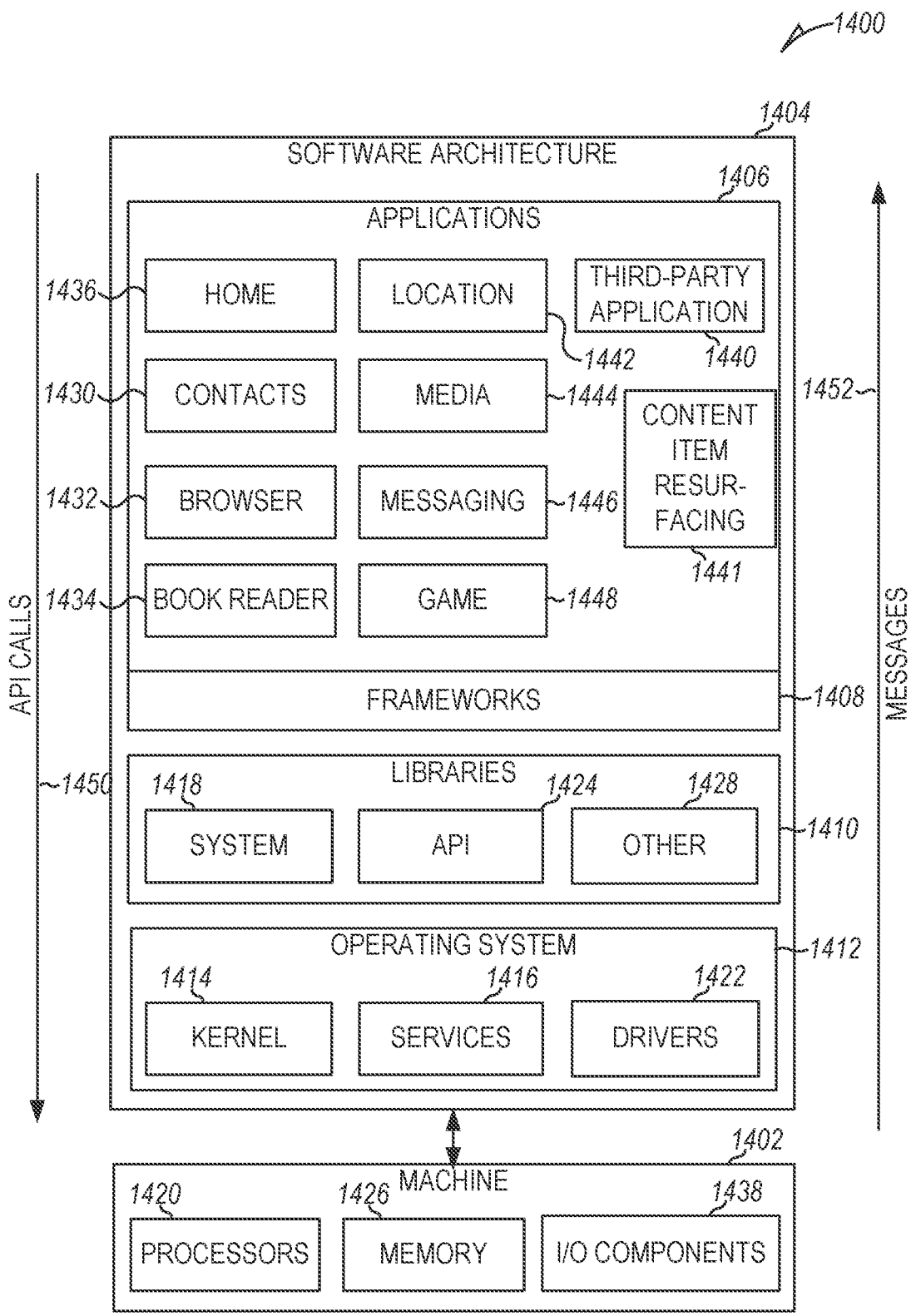
FIG. 14 is a block diagram showing a software architecture within which examples may be implemented.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1410 provide a common low-level infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a common high-level infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example, the applications 1406 may include a home application 1436, a contacts application 1430, a browser application 1432, a book reader application 1434, a content item resurfacing 1441 application, a location application 1442, a media application 1444, a messaging application 1446, a game application 1448, and a broad assortment of other applications such as a third-party application 1440. The content item resurfacing 1441 application may perform the operations as disclosed in conjunction with FIGS. 6 and 9 and herein. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

Processing Components

Figure 15:
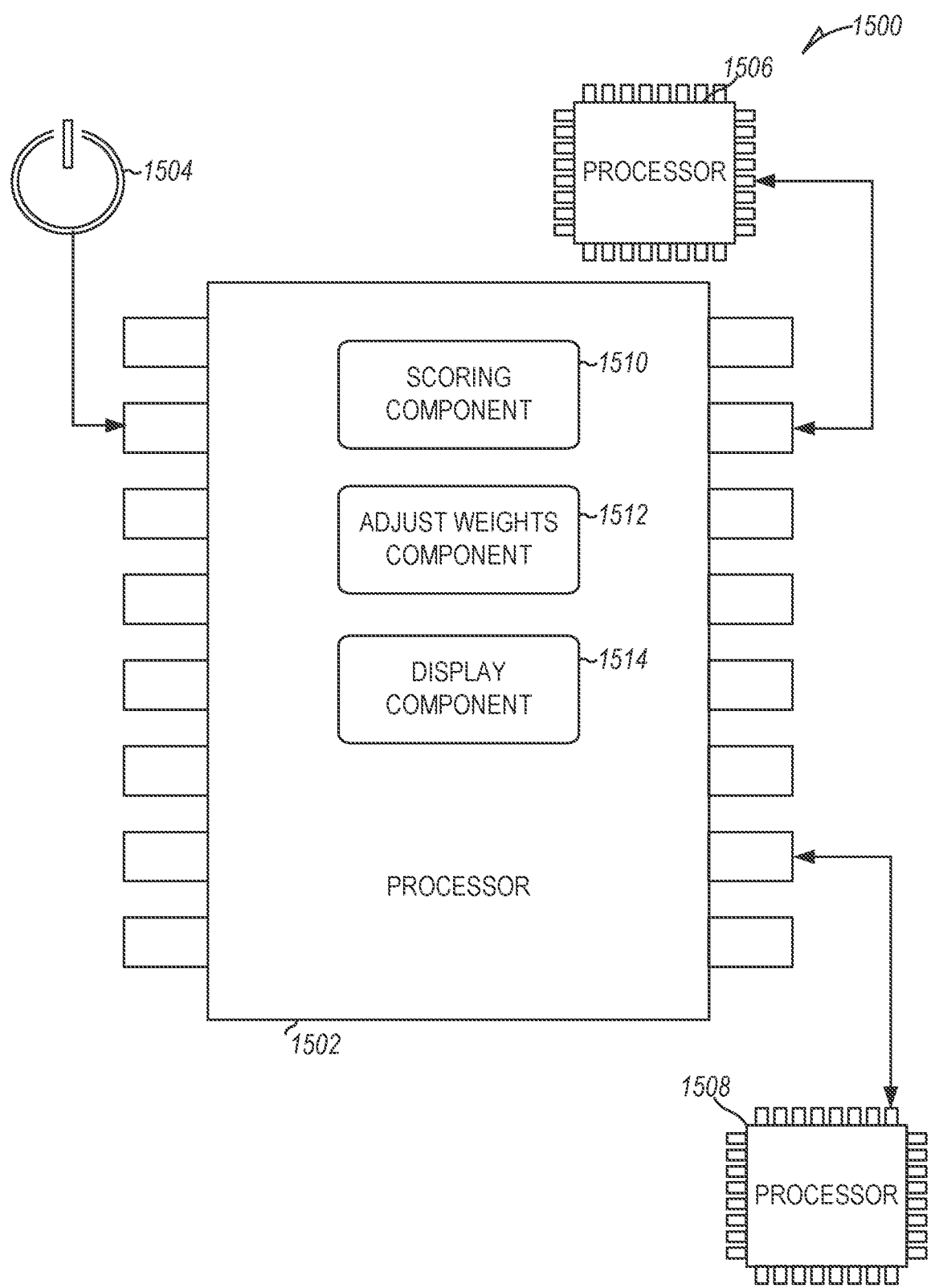
FIG. 15 is a diagrammatic representation of a processing environment, in accordance with some examples.

Turning now to FIG. 15, there is shown a diagrammatic representation of a processing environment 1500, which includes a processor 1502, a processor 1506, and a processor 1508 (e.g., a GPU, CPU or combination thereof). The processor 1502 is shown to be coupled to a power source 1504, and to include (either permanently configured or temporarily instantiated) modules, namely a scoring component 1510, an adjust weights component 1512, and a display component 1514. Referring to FIG. 6, the scoring component 1510 determines the scores 604 for the content items 702; the adjust weights component 1512 operationally adjusts the weights 616 based on the resurface signals 734 and signals 732; and, the display component 1514 operationally displays the content items to resurface 630. As illustrated, the processor 1502 is communicatively coupled to both the processor 1506 and the processor 1508.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1502 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computing apparatus for resurfacing content items, the computing apparatus comprising:
   one or more processors; and
   a memory storing instructions that, when executed by the one or more processors, configure the computing apparatus to perform operations comprising:
   in response to a user performing an interaction with a content item, determining a score to assign to the interaction and updating a resurface score associated with the content item with the score, wherein the score is based on a weight, of a plurality of weights, associated with the interaction of a plurality of interactions;
   determining to resurface the content item to the user based on the resurface score;
   displaying, on a display of a client device, a user interface comprising a user interface item for the user to view the content item; and
   adjusting the plurality of weights based on whether the user selects the user interface item.

2. The computing apparatus of claim 1, wherein the interaction is a first interaction, and wherein the first interaction is the user sharing the content item with a friend within a messaging system, and wherein the operations further comprise:
   in response to the friend performing a second interaction with the content item, determining a second score to assign to the second interaction and updating the resurface score associated with the content item with the second score, the resurface score associated with the content item being associated with the user.

3. The computing apparatus of claim 1, wherein the interaction is a first interaction, the weight is a first weight, and wherein the operations further comprise:
   in response to the user performing a second interaction with the content item, determining a second score to assign to the interaction and updating the resurface score associated with the content item with the second score, wherein the second interaction is the user modifying the content item with modification data, the modification data comprising a text caption or a media overlay.

4. The computing apparatus of claim 1, wherein the interaction is a first interaction, the weight is a first weight, and wherein the operations further comprise:
   in response to the user performing a second interaction with the content item, determining a second score to assign to the second interaction and updating the resurface score associated with the content item with the second score, wherein the second score is determined to be higher for the second interaction when the first interaction comprises the user modifying the content item with modification data than when the second interaction comprises the user viewing the content item.

5. The computing apparatus of claim 1, wherein the interaction is a first interaction, the weight is a first weight, and wherein the operations further comprise:
   in response to the user performing a second interaction with the content item, determining a second score to assign to the interaction and updating the resurface score associated with the content item with the second score, wherein the second score is determined to be higher when the second interaction comprises the user sharing the content item with another user than when the second interaction comprises the user viewing the content item.

6. The computing apparatus of claim 1, wherein the content item is a first content item, the resurface score is a first resurface score, and wherein determining whether to resurface further comprises:
   comparing the first resurface score with a plurality of resurface scores, each of the plurality of resurface scores associated with each of a respective content item of a plurality of content items.

7. The computing apparatus of claim 1, wherein determining the score to assign to the interaction further comprises:
   incrementing a number of times the interaction is performed each time the user performs the interaction on the content item; and
   determining the score to assign to the interaction using a first weight for the interaction when the number of times the interaction is performed is below a threshold number and using a second weight for the interaction when the number of times the interaction is performed is equal to or above the threshold number.

8. The computing apparatus of claim 1, wherein the score is a first score, and wherein determining whether to resurface further comprises:
   in response to the user performing a second interaction with the content item, determining a second score to assign to the interaction and updating the resurface score associated with the content item with the second score, wherein a duration of viewing is associated with the second interaction performed by the user and the second interaction is the content item being displayed on the display of a client device;
   incrementing the duration of viewing in accordance with the duration the content item is displayed on the display of the client device; and
   determining a third score to assign to the interaction using a first weight for the second interaction when the duration of viewing is below a threshold duration and using a second weight for the interaction when the duration of viewing is equal to or above the threshold duration.

9. The computing apparatus of claim 1, and wherein the operations further comprise:
   in response to a selection of the user interface item indicating the user would like to view the content item, updating the plurality of weights based on interactions performed on the content item by the user.

10. The computing apparatus of claim 1, wherein the user interface item is a first user interface item and wherein displaying, on the display of the client device, the user interface comprising the user interface item for the user to view the content item, further comprises:
    displaying a second user interface item for the user to indicate that the user is not interested in the content item; and
    in response to a selection of the second user interface item, updating the plurality of weights based on interactions performed on the content item by the user and the selection of the second user interface item.

11. The computing apparatus of claim 10, wherein the updating the plurality of weights is further based on using logistical regression.

12. The computing apparatus of claim 10, wherein the operations further comprise:
sending the content item to a second client device associated with a second user; and
updating the plurality of weights based on interactions performed on the content item by the second user.

13. The computing apparatus of claim 10, wherein the content item is a first content item, and the operations further comprise:
determining whether to resurface a plurality of second content items to the user based on a plurality of second resurface scores associated with the plurality of second content items compared with a plurality of third resurface scores associated with a plurality of third content items.

14. The computing apparatus of claim 1, wherein determining whether to resurface the content item is further based on a number of days since a last resurfacing of the content item or based on a number of content items generated by the client device of the user since the last resurfacing of the content item.

15. The computing apparatus of claim 1, wherein the operations further comprise:
processing the content item to identify objects within an image of the content item;
determining scores for each of the identified objects; and
updating the resurface score with the scores for each of the identified objects.

16. The computing apparatus of claim 15 where the processing the content item further comprises:
identifying the objects within the image based on a list of objects stored within a messaging system.

17. A non-transitory computer-readable storage medium that stores instructions for execution by one or more processors of a messaging system for resurfacing content items, the instructions to configure the one or more processors to:
in response to a user performing an interaction with a content item, determining a score to assign to the interaction and updating a resurface score associated with the content item with the score, wherein the score is based on a weight, of a plurality of weights, associated with the interaction of a plurality of interactions;
determining to resurface the content item to the user based on the resurface score;
displaying, on a display of a client device, a user interface comprising a user interface item for the user to view the content item; and
adjusting the plurality of weights based on whether the user selects the user interface item.

18. The non-transitory computer-readable storage medium of claim 17, wherein the interaction is a first interaction, and wherein the first interaction is the user sharing the content item with a friend within a messaging system, and wherein the instructions further comprise:
in response to the friend performing a second interaction with the content item, determining a second score to assign to the second interaction and updating the resurface score associated with the content item with the second score, the resurface score associated with the content item being associated with the user.

19. A method of resurfacing content items on a messaging system, comprising:
in response to a user performing an interaction with a content item, determining a score to assign to the interaction and updating a resurface score associated with the content item with the score, wherein the score is based on a weight, of a plurality of weights, associated with the interaction of a plurality of interactions;
determining to resurface the content item to the user based on the resurface score;
displaying, on a display of a client device, a user interface comprising a user interface item for the user to view the content item; and
adjusting the plurality of weights based on whether the user selects the user interface item.

20. The method of claim 19, wherein the interaction is a first interaction, and wherein the first interaction is the user sharing the content item with a friend within a messaging system, and wherein the method further comprise:
in response to the friend performing a second interaction with the content item, determining a second score to assign to the second interaction and updating the resurface score associated with the content item with the second score, the resurface score associated with the content item being associated with the user.

* * * * *